(12) United States Patent
Wu et al.

(10) Patent No.: US 8,482,891 B2
(45) Date of Patent: Jul. 9, 2013

(54) ELECTROSTATIC DISCHARGE PROTECTION CIRCUIT

(75) Inventors: Chien Ming Wu, Tao Yuan County (TW); Tay-Her Tsaur, Tai Nan (TW)

(73) Assignee: Realtek Semiconductor Corp., Hsinchu (TW)

(*) Notice: Subject to any disclaimer, the term of this patent is extended or adjusted under 35 U.S.C. 154(b) by 94 days.

(21) Appl. No.: 13/170,704

(22) Filed: Jun. 28, 2011

(65) Prior Publication Data

US 2011/0317319 A1 Dec. 29, 2011

(30) Foreign Application Priority Data

Jun. 29, 2010 (TW) .............................. 99121149 A

(51) Int. Cl.
*H02H 9/00* (2006.01)
(52) U.S. Cl.
USPC ............................................................ 361/56
(58) Field of Classification Search
USPC ............................................................ 361/56
See application file for complete search history.

(56) References Cited

U.S. PATENT DOCUMENTS

| | | | |
|---|---|---|---|
| 6,954,098 B2 * | 10/2005 | Hsu et al. | 327/313 |
| 7,397,641 B2 * | 7/2008 | Chu et al. | 361/56 |
| 7,397,642 B2 * | 7/2008 | Ker et al. | 361/56 |
| 8,072,722 B1 * | 12/2011 | Hwang | 361/56 |
| 2006/0103998 A1 * | 5/2006 | Smith | 361/91.1 |
| 2007/0183104 A1 * | 8/2007 | Tseng | 361/56 |
| 2008/0232012 A1 * | 9/2008 | Chu et al. | 361/56 |
| 2008/0316659 A1 * | 12/2008 | Oguzman et al. | 361/56 |
| 2010/0148797 A1 * | 6/2010 | Ker et al. | 324/555 |

* cited by examiner

*Primary Examiner* — Ronald W Leja
(74) *Attorney, Agent, or Firm* — Muncy, Geissler, Olds & Lowe, PLLC

(57) ABSTRACT

An ESD (Electrostatic Discharge, ESD) protection circuit includes a voltage-divider generating circuit, a decision circuit, and a switching circuit. The voltage-divider generating circuit outputs a first voltage and a second voltage according to an input voltage. The decision circuit is coupled to the voltage-divider generating circuit and receives the first voltage and the second voltage. The decision circuit outputs an output voltage according to the first voltage and the second voltage. The switching circuit is coupled to the decision circuit and is either turned on or turned off according to the output voltage. The transient voltages of the first and the second voltage are different.

21 Claims, 12 Drawing Sheets

ELECTROSTATIC DISCHARGE PROTECTION CIRCUIT

BACKGROUND OF THE INVENTION (a) Field of the Invention

The invention relates to an electronic circuit, particularly to an electrostatic discharge (ESD) protection circuit.

(b) Description of the Related Art

Electrostatic discharge (ESD) usually is the major cause of damage by electric stress for most electronic components. Such damage is permanent to an electronic component to thereby affect the normal operation of the electronic component. Generally, an electrostatic discharge (ESD) protection circuit is used to prevent electrostatic discharge damage.

A conventional ESD protection circuit uses a voltage rising speed to distinguish whether there is electrostatic discharge or not. However, if the power on operation is so fast to result in voltage quickly rising, the conventional ESD protection circuit cannot distinguish normal power on operation from electrostatic discharge to mistakenly start the ESD protection circuit to have an unexpected current flow through the ESD protection circuit.

BRIEF SUMMARY OF THE INVENTION

One object of the invention is to provide an electrostatic discharge (ESD) protection circuit to prevent the unexpected false operation.

One object of the invention is to provide an electrostatic discharge (ESD) protection circuit to prevent normal turning-on operation from being recognized as electrostatic discharge to mistakenly start the electrostatic discharge (ESD) protection circuit.

One object of the invention is to provide an electrostatic discharge (ESD) protection circuit to prevent from mistakenly starting the electrostatic discharge (ESD) protection circuit due to power charge with quick voltage rising.

One object of the invention is to provide an electrostatic discharge (ESD) protection circuit to prevent from mistakenly starting the electrostatic discharge (ESD) protection circuit due to quick voltage rising.

One embodiment of the invention provides an electrostatic discharge (ESD) protection circuit, having a first node for receiving an input voltage. The ESD protection circuit comprises a voltage-divider generating circuit, a decision circuit, and a switching circuit. The voltage-divider generating circuit outputs a first voltage and a second voltage. The first voltage and the second voltage are used to respond to the variation of the transient voltage of the input voltage. The transient voltages of the first and the second voltage are different. The decision circuit is coupled to the voltage-divider generating circuit, receives the first voltage and the second voltage and determines the voltage level of an output voltage according to the first voltage and the second voltage. The switching circuit is coupled to the decision circuit and is either turned on or turned off according to the output voltage.

The ESD protection circuit according to the invention can recognize either electrostatic discharge or a normal operating voltage even under a condition of quick voltage rising to thereby prevent false operation of the ESD protection circuit.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

Figure 1:
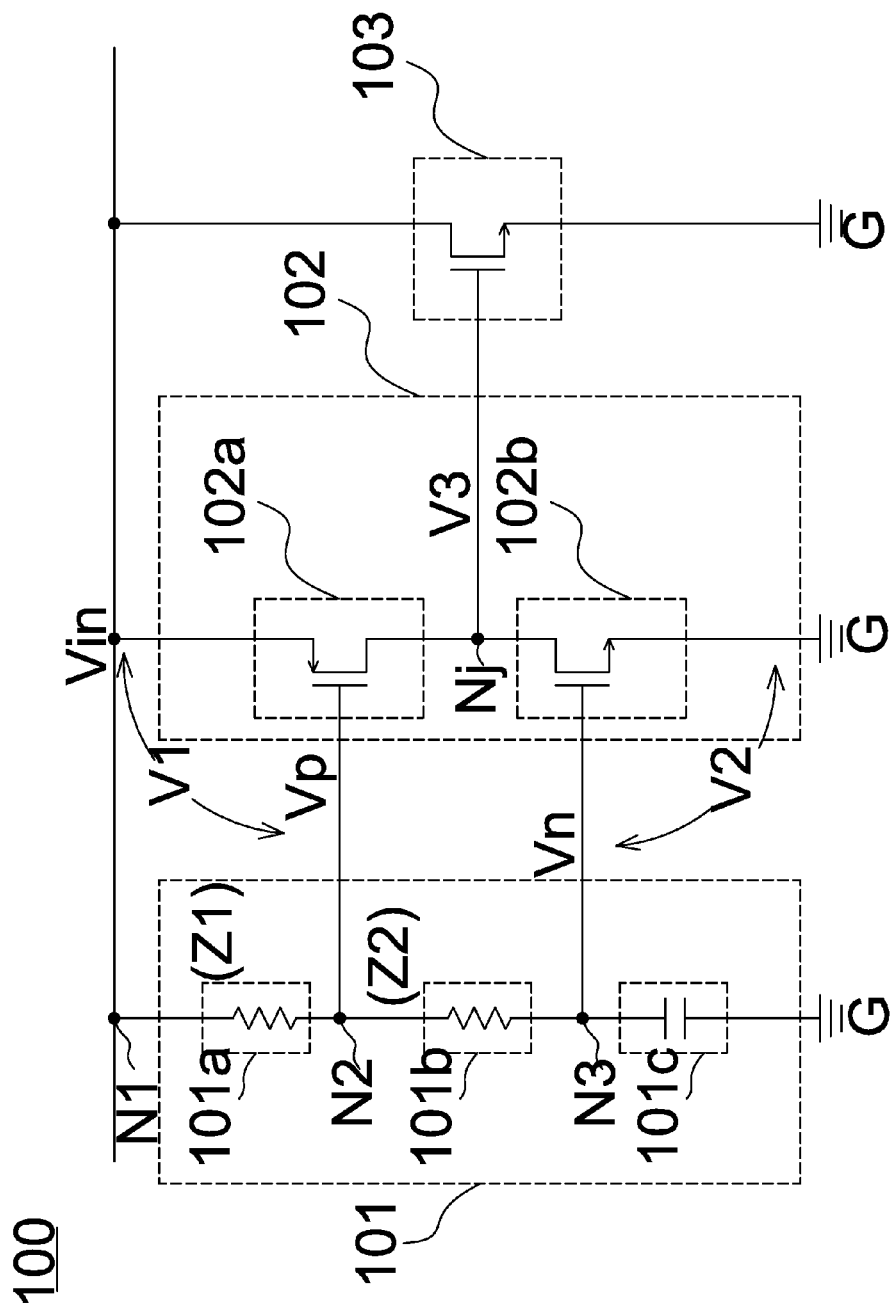
FIG. 1 shows a schematic diagram illustrating an electrostatic discharge (ESD) protection circuit according to one embodiment of the invention.

FIG. 1 shows a schematic diagram illustrating an electrostatic discharge (ESD) protection circuit according to one embodiment of the invention. As shown in FIG. 1, the ESD protection circuit 100 comprises a voltage-divider generating circuit 101, a decision circuit 102, and a switching circuit 103. The ESD protection circuit 100 has a node N1 to receive an input voltage Vin and determines to either turn on or turn off the switching circuit 103 according to the voltage level of the input voltage Vin and the rising speed of the input voltage Vin in a transient period. When the switching circuit 103 is turned on, the current is released to ground potential G via the switching circuit 103.

In one embodiment, as shown in FIG. 1, the voltage-divider generating circuit 101 comprises resistors 101a, 101b and a capacitor 101c. One end of the resistor 101a is coupled to the node N1 and the other end is coupled to the resistor 101b in series. The decision circuit 102 is coupled to a node N2 between the resistors 101a and 101b. The capacitor 101c is coupled to the resistor 101b. The decision circuit 102 is coupled to a node N3 between the resistor 101b and the capacitor 101c. The nodes N2 and N3 separately output voltages $V_p$ and $V_n$.

It should be noted that, in one embodiment, when the resistors 101a and 101b are coupled in series, the voltage levels of the voltages $V_p$ and $V_n$ are determined by the resistances of the resistors 101a, 101b and the capacitor 101c. In another embodiment, the number of resistors and capacitors and the coupling method (for example, coupled in series or parallel) are not limited to the above example and can be determined according to a designer. Besides, the resistors and/or capacitors can be implemented by any current or future semiconductor element, such as transistors, etc.

In one embodiment, as shown in FIG. 1, the decision circuit 102 comprises switches 102a and 102b. One end of the switch 102a is coupled to the node N2 of the voltage-divider generating circuit 101, another end is coupled to the input voltage Vin, and the other end is coupled to the switch 102b to form a node Nj. One end of the switch 102b is coupled to the node N3 of the voltage-divider generating circuit 101, another end is coupled to the node Nj, and the other end is coupled to ground potential G.

The switches 102a and 102b receive the voltages $V_p$ and $V_n$, respectively, and an output voltage V3 is determined according to the voltages $V_p$ and $V_n$. Thus, the decision circuit 102 varies the voltage level of the output voltage V3 with the change of the voltage levels of the voltages $V_p$ and $V_n$.

In one embodiment, the switch 102a can be implemented by a P type metal oxide semiconductor field effect transistor (MOSFET) and the switch 102b can be implemented by an N type MOSFET. Certainly, in another embodiment, the switches 102a and 102b are not limited to the above examples and can be implemented by any current or future semiconductor element.

In FIG. 1 as one example, the source electrode of the switch 102a is coupled to the node N1 and receives the input voltage Vin. The gate electrode of the switch 102a determines to turn on or turn off or the current flowing through the switch 102a according to the voltage level of the voltage $V_p$. Besides, the turn-on voltage V1 is the voltage difference between the input voltage Vin and the voltage $V_p$, that is, $V1=Vin-V_p$. The turn-on voltage V2 is the voltage difference between the input voltage $V_n$ and the ground potential G, that is, $V2=V_n-0$. Correspondingly, the drain electrode of the switch 102b is coupled to the drain electrode of the switch 102a. The source electrode of the switch 102b is coupled to the ground potential G and the gate electrode of the switch 102b determines to turn on or turn off or the current flowing through the switch 102b according to the voltage level of the voltage V. Therefore, the voltage level of the output voltage V3 of the decision circuit 102 can be adjusted by controlling the turn-on states of the switches 102a and 102b.

In one embodiment, the switching circuit 103 is coupled to the decision circuit 102 and the input voltage Vin and the turn-on or turn off state of the switching circuit 103 or the current flowing through the switch 102a is determined according to the output voltage V3 to thereby achieve the purpose of controlling the operation of the switching circuit 103. For example, when the switching circuit 103 is enabled, the current is released to the ground potential G via the switching circuit 103. In this embodiment, the switching circuit 103 can be implemented by an N type MOFET but is not limited to this example. In another embodiment, it can be implemented by any current or future semiconductor element.

The following illustrates the ESD protection circuit 100 determines the input voltage Vin received by the node N1 to be either an operating voltage Vdd under quick start or an electrostatic voltage $V_{ESD}$. Thus, please refer to FIG. 2A. In one embodiment of the invention, when the input voltage Vin is an operating voltage Vdd under quick start, the relation of the input voltage Vin during the quick power on period Tr (that is, the input voltage Vin is quick rising, usually Tr is smaller than 10 μs), the voltage $V_p$ and the resistors 101a, 101b substantially satisfies the following equations:

$$V_{in} - V_p = V_1 = \frac{Z_1}{Z_1 + Z_2} \times V_{in} \quad (1)$$

$$Vdd - V_p = V_1 = \frac{Z_1}{Z_1 + Z_2} \times Vdd < V_{thp} \quad (2)$$

where Z1 and Z2 separately represent the equivalent resistances of the resistors 101a and 101b, Vdd represents the operating voltage of the input voltage Vin, $V_{thp}$ represents the threshold voltage of the switch 102a, and V1 represents the turn-on voltage of the switch 102a. Noticeably, when the input voltage Vin is under the quick power on period Tr, since the input voltage Vin is rising very fast, the voltage difference of the capacitor 101c will not vary instantaneously, one end of the capacitor 101c is coupled to the ground potential and thus the voltage $V_n$ is close to zero. It should be noted that, after the quick power on period Tr, the effect of the capacitor 101c starts and the voltages $V_p$ and $V_n$ are slowly rising, as shown in FIG. 2A.

Figure 2A:
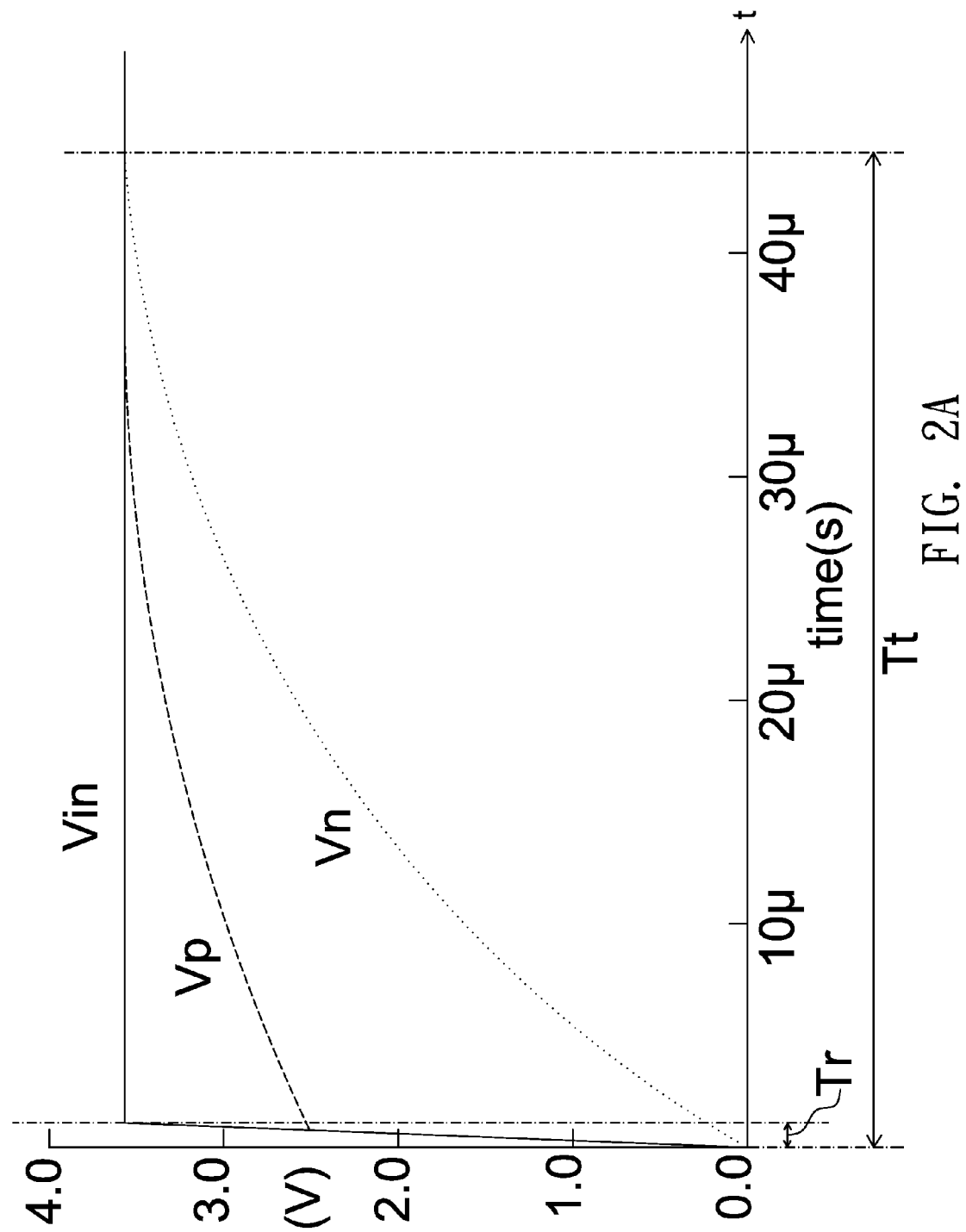
FIG. 2A shows a schematic diagram illustrating voltage simulation of an electrostatic discharge (ESD) protection circuit under quick voltage rising during powering on the circuit according to one embodiment of the invention.

Please refer to FIG. 2A. FIG. 2A shows a schematic diagram illustrating voltage simulation of the ESD protection circuit 100 under quick voltage rising during powering on the circuit according to one embodiment of the invention. From FIG. 2A, the relation of the voltages Vin, $V_p$, and $V_n$ are shown.

The voltage-divider generating circuit 101 receives the input voltage Vin and outputs a voltage $V_p$ and a voltage $V_n$ according to the input voltage Vin. When the input voltage Vin is under quick power on period Tr (for example just powering on the circuit), the switch 102a is under a turn-off state by designing the resistances Z1, Z2 of the resistors 101a, 101b and the turn-on voltage V1 formed by the transient voltage of the voltage $V_p$ and the operating voltage Vdd. It can be understood from FIG. 2A that during a transient period Tt, that is, the period from powering on (t=0) until a stable state including the quick power on period Tr, the turn-on voltage V1 formed by the transient voltage of the voltage $V_p$ and the operating voltage Vdd makes the switch 102a still under the turn-off state. Thus, from the above description, in the ESD protection circuit 100, when the input voltage Vin is quickly rising and smaller than a preset value, the transient voltage of the voltage $V_p$ makes the switch 102a still under the turn-off state. For example, in practice, the operating voltage is 3.3V and the preset value is set to 3.3V (or slightly higher than 3.3V). When the input voltage Vin is smaller than or equal to 3.3V, the transient voltage of the voltage $V_p$ outputted by the voltage-divider generating circuit 101 makes the switch 102a still under the turn-off state.

Similarly, when the input voltage Vin is quickly rising and larger than another preset value, the transient voltage of the voltage $V_p$ makes the switch 102a under the turn-on state. For example, in practice, the operating voltage is 3.3V and the preset value is set to 5V. When the input voltage Vin is larger than 5V, the transient voltage of the voltage $V_p$ outputted by the voltage-divider generating circuit 101 makes the switch 102a under the turn-on state.

Besides, during the transient period Tt, the transient voltage of the voltage $V_p$ is different from that of the voltage V. In order to let the switching circuit 103 during the transient period Tt be turned off, the voltages $V_p$, $V_n$ and the operating voltage Vdd have a preset relation, that is, the turn-on voltage V1 formed by $V_p$ and Vdd makes the switch 102a under the turn-off state.

Figure 2B:
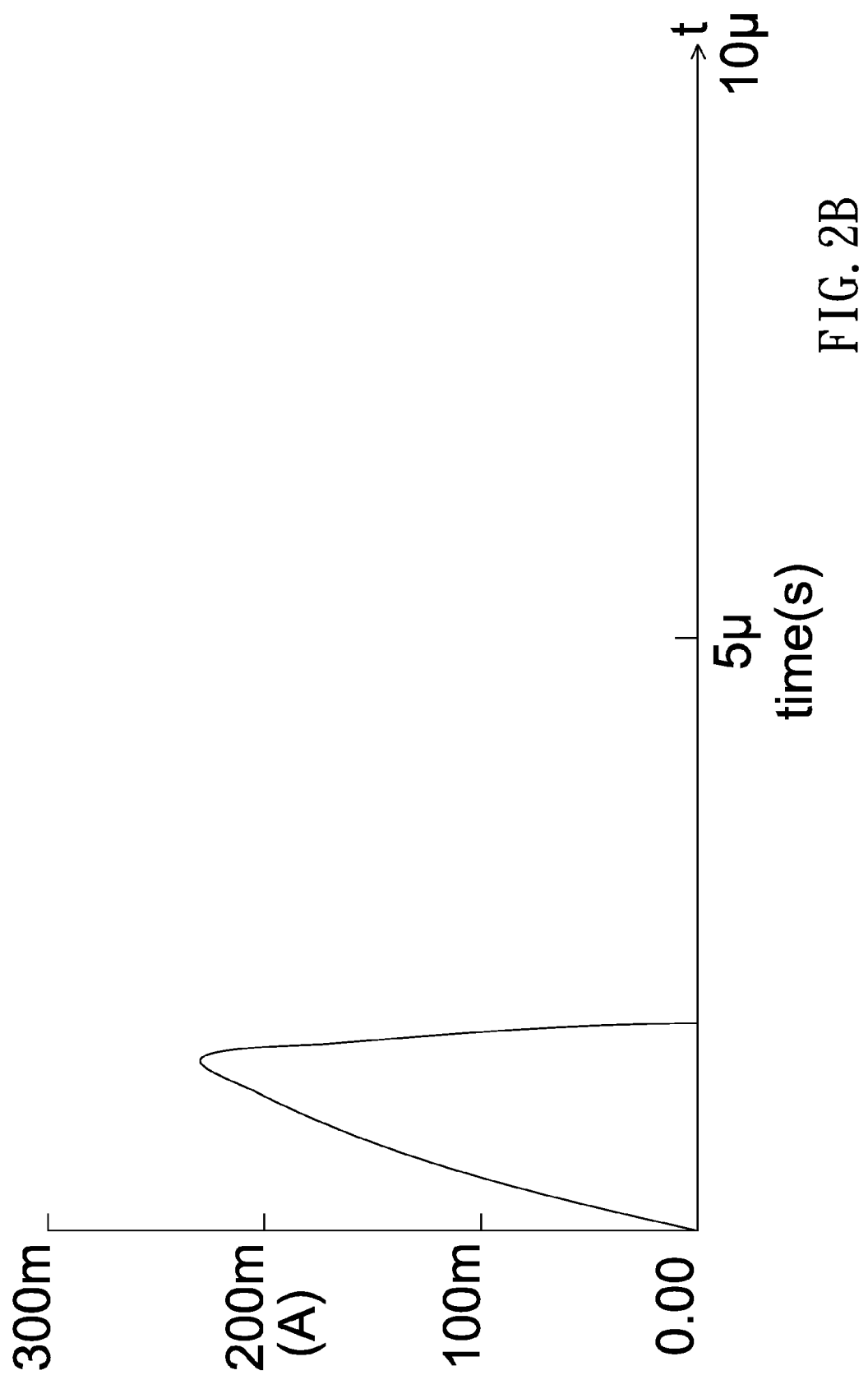
FIG. 2B shows a schematic diagram illustrating current simulation corresponding to FIG. 2A.

It should be noted that, when the input voltage Vin is the operating voltage Vdd without interference of $V_{ESD}$, the input voltage Vin of the ESD protection circuit 100 is under the quick power on period Tr and, from the above equation (2)

$$\left(V_1 = \frac{Z_1}{Z_1 + Z_2} \times Vdd < V_{thp}\right)$$

and because of the divided voltage of the resistances Z1 and Z2, the operating voltage Vdd makes the voltage level of the turn-on voltage V1 smaller than the threshold voltage $V_{thp}$ of the switch 102a. Certainly, because of the effect of the capacitor 101c, after the quick power on period Tr and before the ESD protection circuit 100 is under a stable state, the voltage $V_p$ gradually rises and thus the voltage level of the turn-on voltage V1 is still smaller than the threshold voltage $V_{thp}$ of the switch 102a. Therefore, the switch 102a is under the turn-off state to prevent the switching circuit 103 from having false operation to turn on the switch 102a when the rising speed of the input voltage Vin is as fast as that of electrostatic discharge. As for the voltage level of the turn-on voltage V2 of the node N3, since the input voltage Vin (Vdd) is quickly rising, the charge accumulation speed of the capacitor 101c is slowed down and the voltage level of the turn-on voltage V2 is still at a low voltage level (close to zero) to have the switch 102b under the turn-off state. Since the switches 102a and 102b are both under the turn-off state, the node Nj is floating and the output voltage V3 is unknown. Referring to FIG. 2B, the above mentioned output voltage V3 is unknown and may cause the switching circuit 103 to be turned on and the ESD protection circuit 100 may generate an unexpected current flowing through the switching circuit 103. However, since the voltage $V_n$ (that is, turn-on voltage V2) after the quick power on period Tr is slowly rising, as soon as the voltage $V_n$ is larger than the threshold voltage $V_{thn}$ of the switch 102b, the switch 102b is under the turn-on state. At the time the output voltage V3 is at a low voltage level to ensure the switching circuit 103 under the turn-off state. Compared to the unexpected maximum current value of a conventional ESD protection circuit being usually more than 400 mA, the unexpected maximum current value according to the embodiment is much smaller than 400 mA and thus the unexpected current is greatly reduced. After the ESD protection circuit 100 is under a stable state, from FIG. 2A, the voltage levels of $V_p$ and $V_n$ are separately equal to that of the operating voltage Vdd and the switching circuit 103 is still under the turn-off state.

When the input voltage Vin is the electrostatic voltage $V_{ESD}$ and the input voltage Vin is under the quick power on period Tr, the ESD protection circuit substantially satisfies the following equation:

$$V_{ESD} - Vp = V_1 = \frac{Z_1}{Z_1 + Z_2} \times V_{ESD} > V_{thp} \quad (3)$$

where $V_{ESD}$ represents the voltage level generated at the time of electrostatic discharge.

Figure 3A:
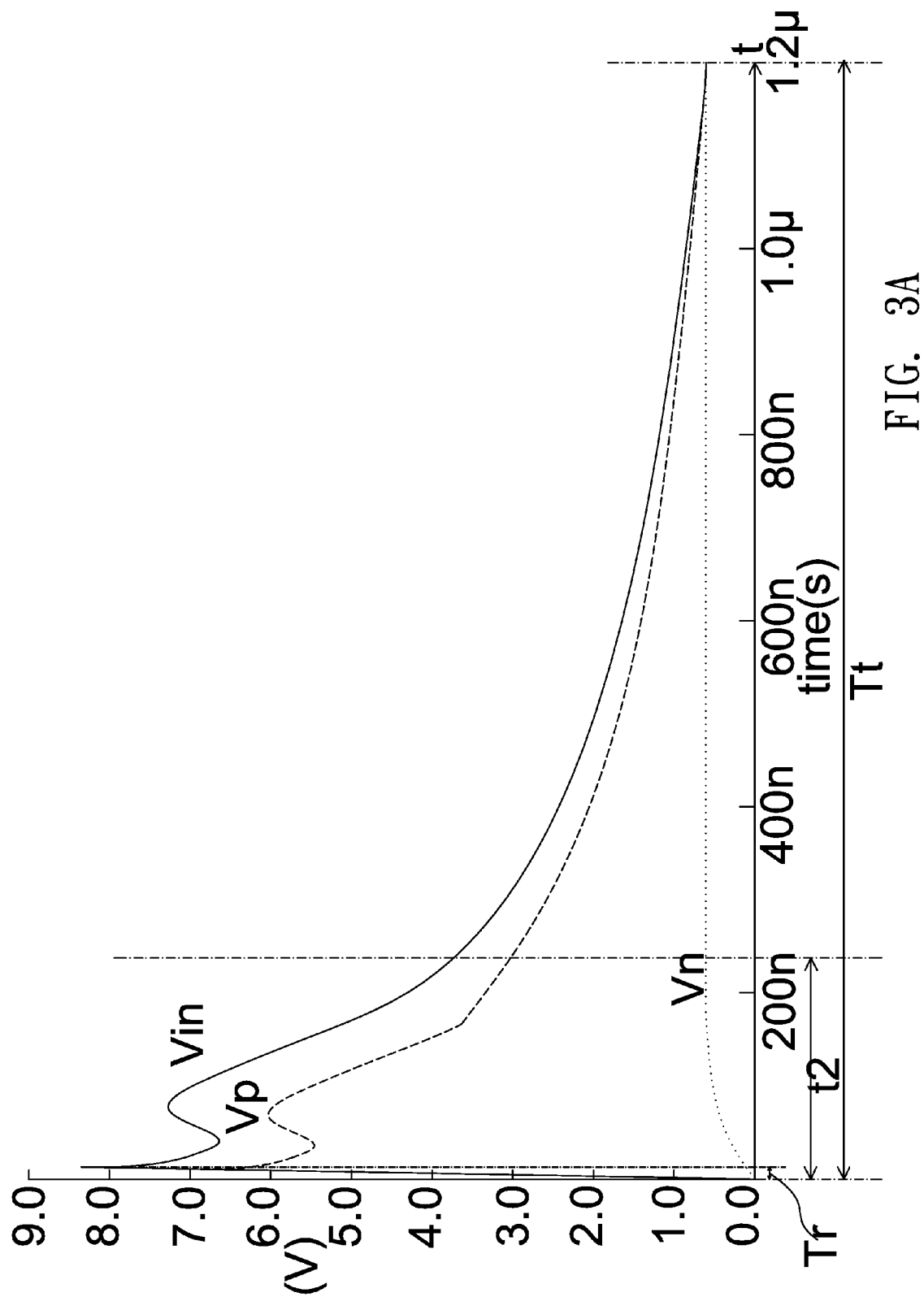
FIG. 3A shows a schematic diagram illustrating voltage simulation of the electrostatic discharge (ESD) protection circuit when an electrostatic voltage $V_{ESD}$ occurs according to one embodiment of the invention.

Please refer to FIG. 3A. FIG. 3A shows a schematic diagram illustrating voltage simulation of the electrostatic discharge (ESD) protection circuit when the electrostatic voltage $V_{ESD}$ is directed into the circuit according to one embodiment of the invention. From FIG. 3A, the relation of the voltages Vin, $V_p$, and $V_n$ are shown.

When electrostatic discharge occurs and the input voltage Vin is the electrostatic voltage $V_{ESD}$, from the above equation (3)

$$\left(V_1 = \frac{Z_1}{Z_1 + Z_2} \times V_{ESD} < V_{thp}\right),$$

the voltage $V_{ESD}$ is still divided by the resistances Z1 and Z2, the voltage level of the electrostatic voltage $V_{ESD}$ is far larger than the operating voltage Vdd even after voltage dividing and thus the voltage level of the turn-on voltage V1 caused by the electrostatic voltage $V_{ESD}$ is larger than that of the threshold voltage $V_{thp}$ of the switch 102a. Thus, the switch 102a is under the turn-on state and the switching circuit 103 is turned on to release the current caused by the electrostatic voltage $V_{ESD}$. Noticeably, after the period Tr of electrostatic voltage $V_{ESD}$ quickly rises, from FIG. 3A, it is found that the voltages $V_p$ and $V_n$ are still slowly rising and gradually close to the input voltage Vin. In FIG. 3A, the labeled time "t2" indicates the time when the turn-on voltage V2 formed by the voltage $V_p$ and the electrostatic voltage is smaller than the threshold voltage $V_{thp}$ of the switch 102a. At the time, the switching circuit 103 is turned off.

The voltage level of the turn-on voltage V2 of the node N3 causes the charge accumulation speed of the capacitor 101c to slow down because the electrostatic voltage $V_{ESD}$ is quickly rising. Thus, the voltage level of the turn-on voltage V2 is still at a low level (close to zero) and the switch 102b is still under the turn-off state. Noticeably, in this embodiment, the RC time constant composed of the resistors 101a, 101b and the capacitor 101 c is required to be larger than the period of electrostatic discharge to make the switch 102b still under the turn-off state during the electrostatic discharge.

Figure 3B:
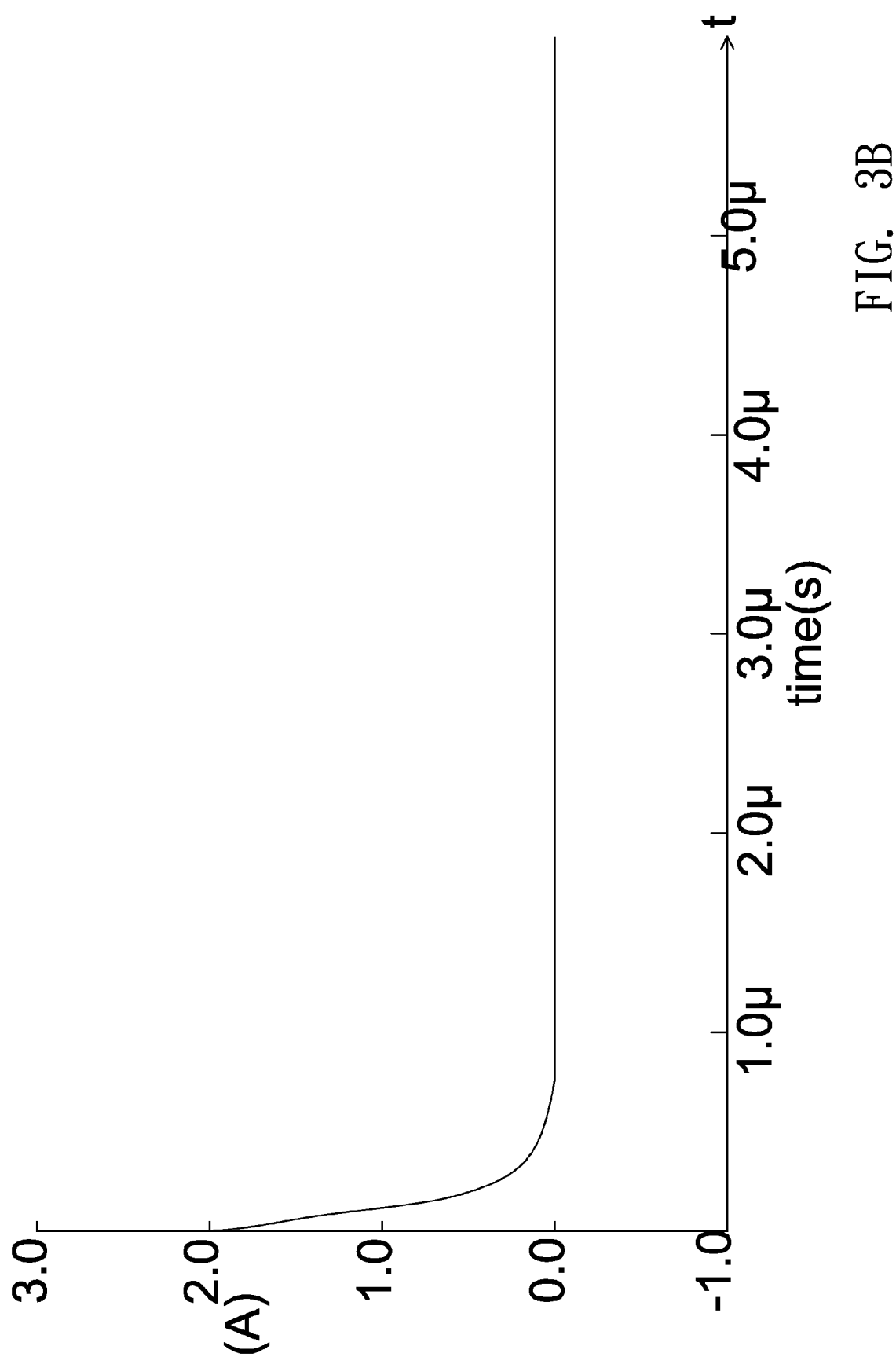
FIG. 3B shows a schematic diagram illustrating current simulation corresponding to FIG. 3A.

Please further refer to FIG. 3B. FIG. 3B shows a schematic diagram illustrating current simulation of the ESD protection circuit corresponding to FIG. 3A. In the period that the turn-on voltage V1 is larger than the threshold voltage $V_{thp}$ of the switch 102a, since the switching circuit 103 is turned on, an electrostatic discharge current (current shown in FIG. 3B) is generated and flows through the switching circuit 103 to be released to the ground potential G via the switching circuit 103 to prevent permanent damage by the electrostatic voltage $V_{ESD}$.

It should be noted that as shown in FIG. 3A, when the ESD protection circuit is under a stable state, the voltage levels of the electrostatic voltage $V_{ESD}$, the voltage $V_p$, and the voltage $V_n$ are almost the same.

Figure 4:
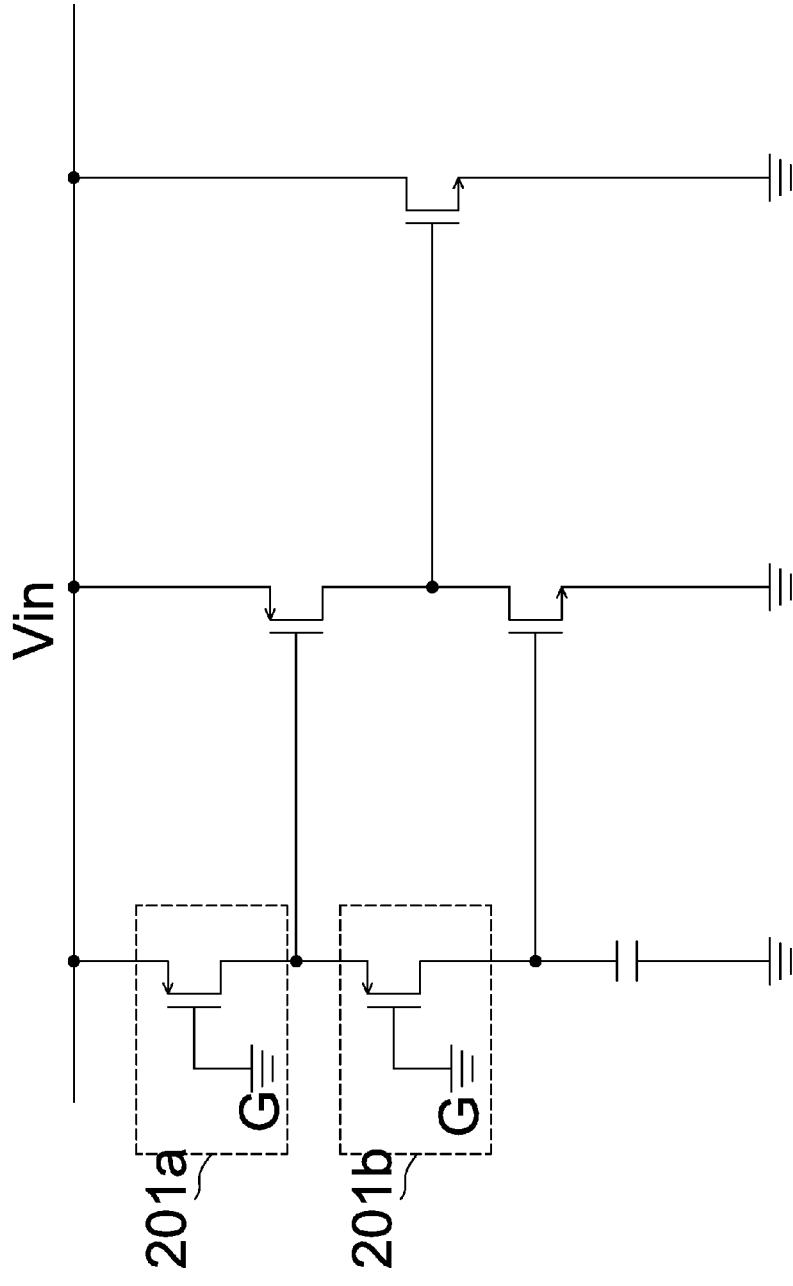
FIG. 4 shows a schematic diagram illustrating an electrostatic discharge (ESD) protection circuit according to one embodiment of the invention.

Please refer to FIG. 4. FIG. 4 shows a schematic diagram illustrating the voltage-divider generating circuit of an electrostatic discharge (ESD) protection circuit according to one embodiment of the invention. As shown in FIG. 4, the difference between the ESD protection circuit 200 and the ESD protection circuit 100 is that the resistors 201a, 201b are separately implemented by P type MOFETs. The gate electrodes of the resistors 201a, 201b are separately coupled to the ground potential G and the equivalent resistances of the resistors 201a, 201b are Z1 and Z2, respectively. Till now, the rest of operating principle is the same as that of the protection circuit 100. For clarity, the details will not be given hereinafter.

Figure 5:
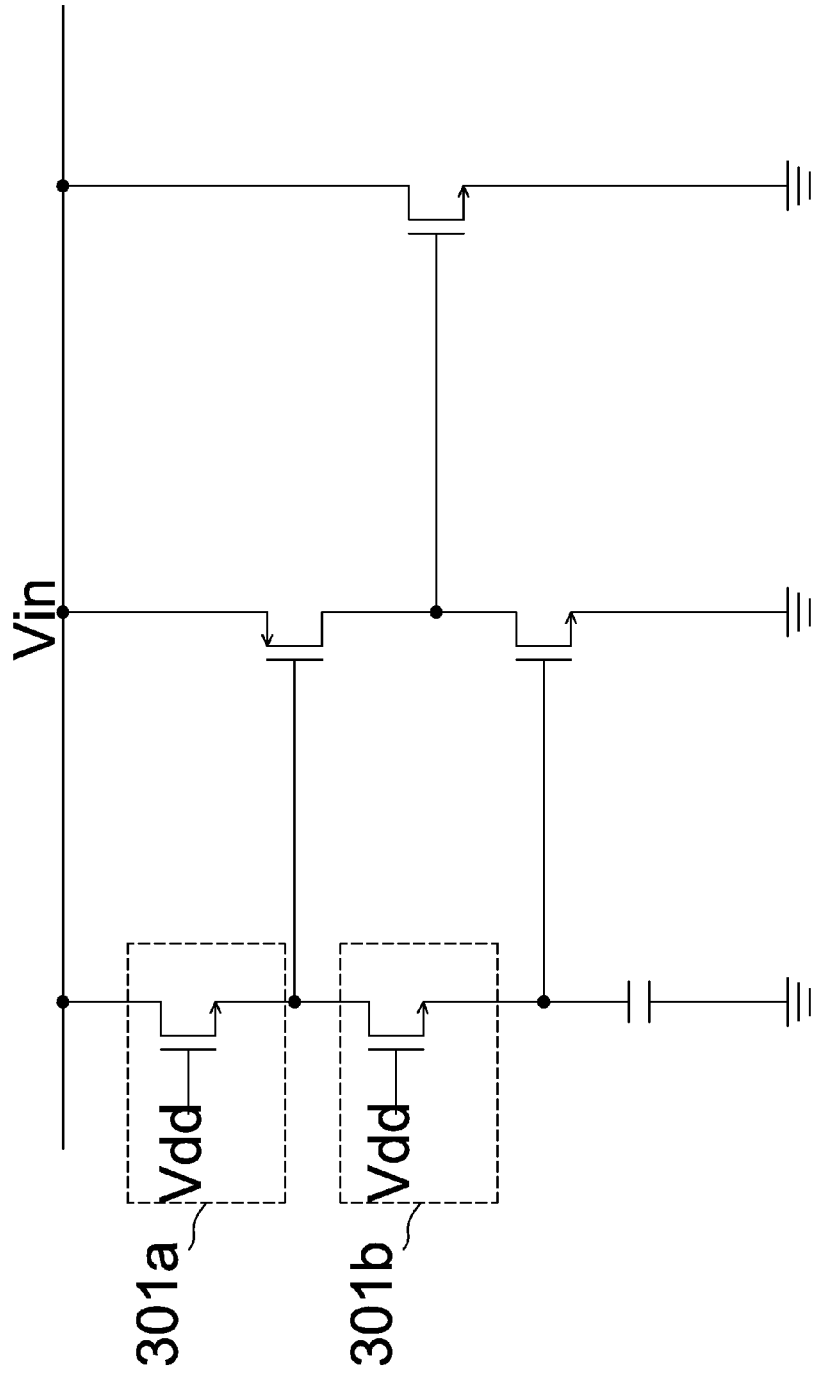
FIG. 5 shows a schematic diagram illustrating an electrostatic discharge (ESD) protection circuit according to one embodiment of the invention.

Please refer to FIG. 5. FIG. 5 shows a schematic diagram illustrating the voltage-divider generating circuit of an electrostatic discharge (ESD) protection circuit according to one embodiment of the invention. As shown in FIG. 5, the difference between the ESD protection circuit 300 and the ESD protection circuit 100 is that the resistors 301a, 301b are separately implemented by N type MOFETs. The gate electrodes of the resistors 301a, 301b are separately coupled to operating voltage Vdd and the equivalent resistances of the resistors 301a, 301b are Z1 and Z2, respectively. Till now, the rest of operating principle is the same as that of the protection circuit 100. For clarity, the details will not be given hereinafter.

Figure 6:
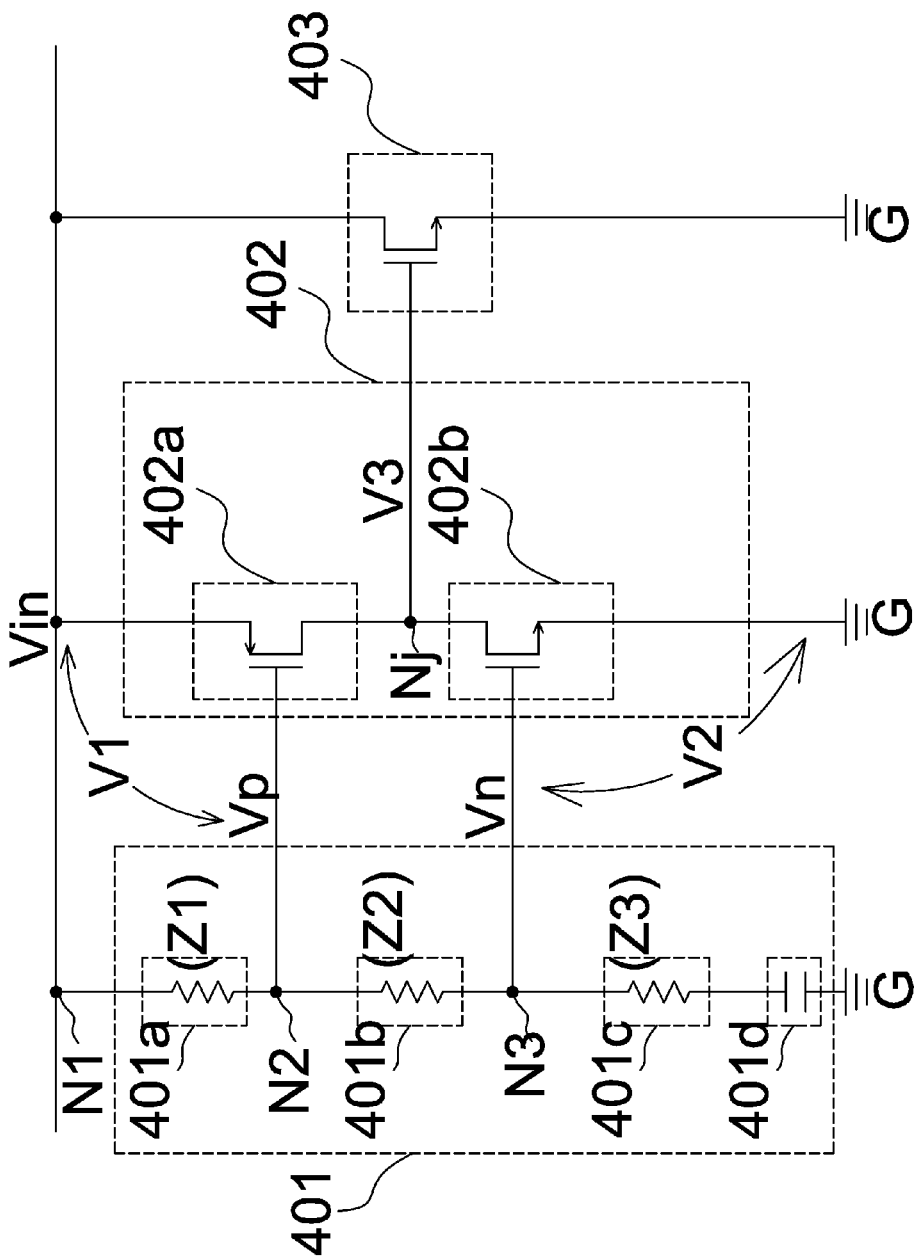
FIG. 6 shows a schematic diagram illustrating an electrostatic discharge (ESD) protection circuit according to one embodiment of the invention.

Please refer to FIG. 6. FIG. 6 shows a schematic diagram illustrating an electrostatic discharge (ESD) protection circuit according to one embodiment of the invention. As shown in FIG. 6, the difference between the ESD protection circuit 400 and the ESD protection circuit 100 is that the voltage-divider generating circuit 401 comprises resistors 401a, 401b, 401c and a capacitor 401d.

One end of the resistor 401a is coupled to the node N1 and the other end is coupled to the resistor 401b in series. Two ends of the resistor 401c are coupled in series to the resistor 401b and the capacitor 401d, respectively.

In addition, the decision circuit 402 is coupled to a node N2 between the resistor 401a and the resistor 401b. The decision circuit 402 is also coupled to a node N3 between the resistor 401b and the resistor 401c and the nodes N2 and N3 output the voltages $V_p$ and $V_n$, respectively.

It should be noted that the resistors 401a, 401b, 401c are coupled in series and thus the voltage level of the voltages $V_p$ and $V_n$ are determined by the resistances of the resistors 401a, 401b, 401c and the capacitor 401d according to the voltage divider theorem.

In one embodiment, as shown in FIG. 6, the decision circuit 402 comprises switches 402a and 402b. One end of the switch 402a is coupled to the node N2 of the voltage-divider generating circuit 401, another end is coupled to the input voltage Vin and the other end is coupled to the switch 402b to form a node Nj. One end of the switch 402b is coupled to the node N3 of the voltage-divider generating circuit 401, another end is coupled to the node Nj and the other end is coupled to ground potential G.

The switches 402a and 402b receive the voltages $V_p$ and $V_n$, respectively. According to the voltages $V_p$ and $V_n$, the voltage level of an output voltage V3 is determined and thus the decision circuit 402 varies the voltage level of the output voltage V3 with the change of the voltage level of the voltages $V_p$ and $V_n$.

In one embodiment, the switch 402a is implemented by a P type MOFET and the switch 402b is implemented by an N type MOFET. Certainly, in another embodiment, the switches 402a and 402b are not limited to the above examples and can be implemented by any current or future semiconductor element.

As shown in FIG. 6, the source electrode of the switch 402a is coupled to the node N1 and receives the input voltage Vin. The gate electrode of the switch 402a determines to turn on or turn off or the current flowing through the switch 402a according to the voltage level of the voltage $V_p$.

Correspondingly, the drain electrode of the switch 402b is coupled to the drain electrode of the switch 402a. The source electrode of the switch 402b is coupled to the ground potential G and the gate electrode of the switch 402b determines to turn on or turn off or the current flowing through the switch 402b according to the voltage level of the voltage V. Therefore, the voltage level of the output voltage V3 of the decision circuit 402 can be adjusted by controlling the turn-on states of the switches 402a and 402b.

In one embodiment, the switching circuit 403 is coupled to the decision circuit 402 and the input voltage Vin and the turn-on or turn off state of the switching circuit 403 or the current flowing through the switching circuit 403 is determined according to the output voltage V3 to thereby achieve the purpose of controlling the operation of the switching circuit 403. For example, when the switching circuit 403 is turned on, the current is released to the ground potential G via the switching circuit 403. In this embodiment, the switching circuit 403 can be implemented by an N type MOFET but is not limited to this example. In another embodiment, it can be implemented by any current or future semiconductor element.

The following illustrates the ESD protection circuit 400 determines the input voltage Vin received by the node N1 to be either an operating voltage Vdd under quick start or an electrostatic voltage $V_{ESD}$. Thus, please refer to FIG. 7A. In one embodiment of the invention, when the input voltage Vin is an operating voltage Vdd under quick start, the relation of the input voltage Vin during the quick power on period Tr (that is, the input voltage Vin is under quick rising, usually Tr is smaller than 10 μs), the voltages $V_p$, $V_n$ and the resistors 401a, 401b, 401c substantially satisfies the following equations:

$$V_{in} - Vp = V_1 = \frac{Z_1}{Z_1 + Z_2 + Z_3} \times V_{in} \quad (5)$$

$$V_n - 0 = V_2 = \frac{Z_3}{Z_1 + Z_2 + Z_3} \times V_{in} \quad (6)$$

$$Vdd - Vp = V_1 = \frac{Z_1}{Z_1 + Z_2 + Z3} \times V_{dd} < V_{thp} \quad (7)$$

$$V_n - 0 = V_2 = \frac{Z_3}{Z_1 + Z_2 + Z3} \times V_{dd} > V_{thn} \quad (8)$$

where Z1, Z2, Z3 represent the equivalent resistances of the resistors 401a, 401b, 401c, respectively, Vdd represents the operating voltage of the input voltage Vin, $V_{thp}$ represents the threshold voltage of the switch 402a, $V_{thn}$ represents the threshold voltage of the switch 402b, V1 represents the turn-on voltage of the switch 402a, and V2 represents the turn-on voltage of the switch 402b. Besides, the turn-on voltage V1 is the voltage difference between the input voltage Vin and the voltage $V_p$, that is, V1=Vin−$V_p$. The turn-on voltage V2 is the voltage difference between the input voltage $V_n$ and the ground potential G, that is, V2=$V_n$−0.

Noticeably, when the input voltage Vin is under the quick power on period Tr, since the input voltage Vin is rising very fast, the voltage difference of the capacitor 401 d will not vary instantaneously and thus in one embodiment the voltage $V_n$ outputted by the node N3 is close to 1V according to the voltage divider theorem. It should be noted that, after the quick power on period Tr, the effect of the capacitor 401d starts and the voltages $V_p$ and $V_n$ are slowly rising, as shown in FIG. 7A.

Figure 7A:
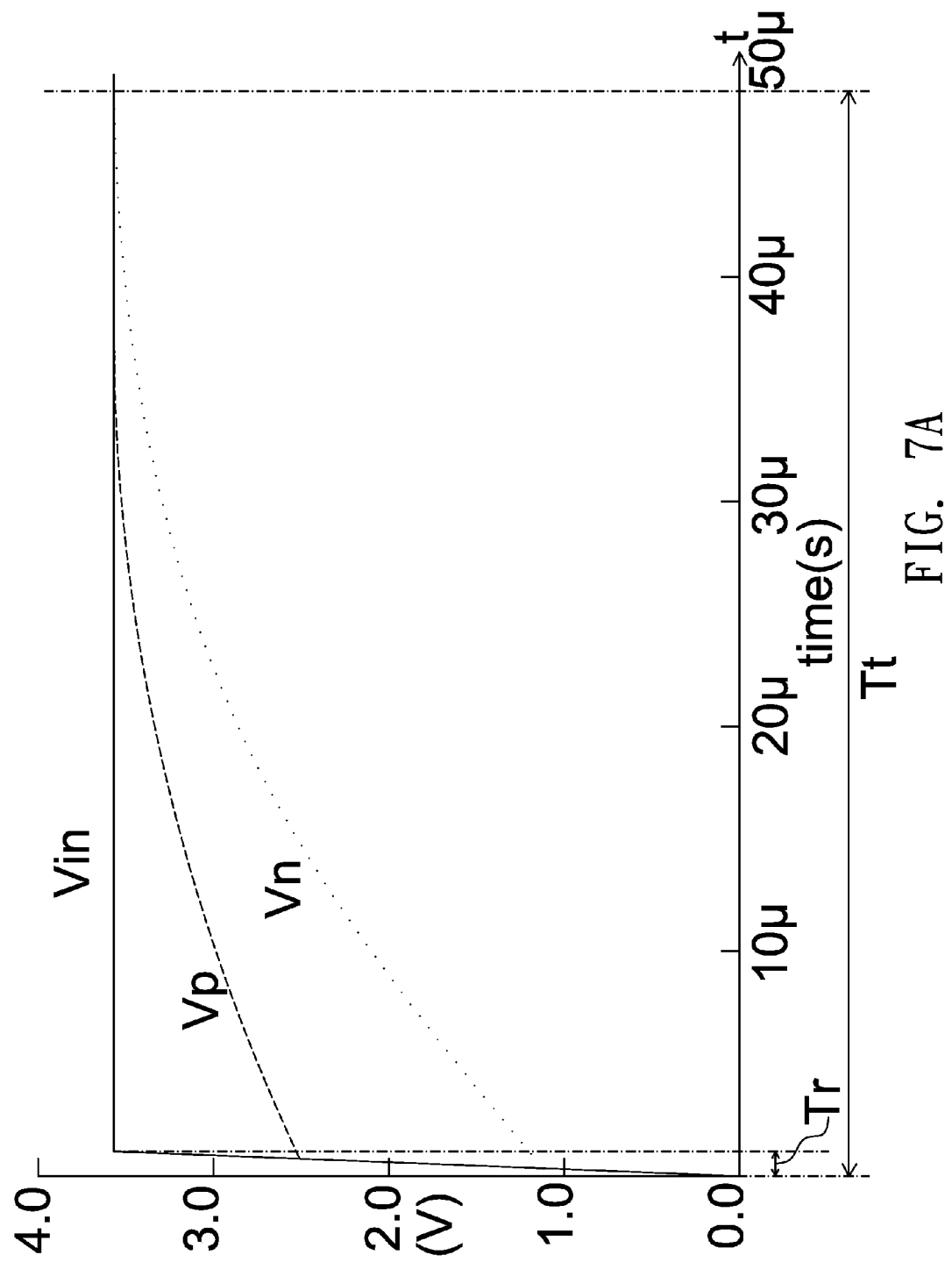
FIG. 7A shows a schematic diagram illustrating voltage simulation of an electrostatic discharge (ESD) protection circuit under quick voltage rising during powering on the circuit according to one embodiment of the invention.

Please refer to FIG. 7A. FIG. 7A shows a schematic diagram illustrating voltage simulation of the ESD protection circuit 400 under quick voltage rising during powering on the circuit according to one embodiment of the invention. From FIG. 7A, the relation of the voltages Vin, $V_p$, and $V_n$ are shown.

The voltage-divider generating circuit 401 receives the input voltage Vin and outputs a voltage $V_p$ and a voltage $V_n$ according to the input voltage Vin. When the input voltage Vin is under the quick power on period Tr (for example just powering on the circuit), the switch 402*a* is under the turn-off state by designing the resistors 401*a*, 401*b*, 401*c*, the corresponding resistances Z1, Z2, Z3 and the turn-on voltage V1 formed by the transient voltage of the voltage $V_p$ and the operating voltage Vdd. It can be understood from FIG. 7A that during a transient period Tt, that is, the period from powering on (t=0) until a stable state including the quick power on period Tr, the turn-on voltage V1 formed by the transient voltage of the voltage $V_p$ and the operating voltage Vdd makes the switch 402*a* still under the turn-off state. Besides, during the transient period Tt, the transient voltages of the voltages $V_p$ and $V_n$ are different. In order to let the switching circuit 403 during the transient period Tt be turned off, the voltages $V_p$ and $V_n$ are designed to have a preset relation, that is, the turn-on voltage V1 formed by $V_p$ and Vdd makes the switch 402*a* under the turn-off state.

It should be noted that, when the input voltage Vin is the operating voltage Vdd without interference of $V_{ESD}$, the input voltage Vin of the ESD protection circuit 400 is under the quick power on period Tr and, from the above equation (7)

$$\left( Vdd - Vp = V_1 = \frac{Z_1}{Z_1 + Z_2 + Z_3} \times V_{dd} < V_{thp} \right)$$

and because of the divided voltage of the resistances Z1, Z2, Z3, the operating voltage Vdd makes the voltage level of the turn-on voltage V1 smaller than the threshold voltage $V_{thp}$ of the switch 402*a*. Certainly, because of the effect of the capacitor 401*d*, after the quick power on period Tr and before the ESD protection circuit 400 is under a stable state, the voltage $V_p$ gradually rises and thus the voltage level of the turn-on voltage V1 is still smaller than the threshold voltage $V_{thp}$ of the switch 402*a*. Therefore, the switch 402*a* is under the turn-off state to prevent the switching circuit 403 from having false operation to turn on the switch 402*a* when the rising speed of the input voltage Vin is as fast as that of electrostatic discharge.

As for the voltage level of the turn-on voltage V2 of the node N3, from the above equation (8)

$$\left( V_n - 0 = V_2 = \frac{Z_3}{Z_1 + Z_2 + Z_3} \times V_{dd} > V_{thn} \right),$$

it is found that the voltage level of the turn-on voltage V2 is designed to be larger than the threshold voltage $V_{thn}$ of the switch 402*b*. In this embodiment, the switch 402*b* is under the turn-on state. In other words, regardless of being during the transient period Tt or after the ESD protection circuit 400 is under a stable state, the switch 402*b* is always under the turn-on state. Thus, the output voltage V3 of the node Nj is pulled to a low voltage level to ensure the switching circuit 403 not being activated to prevent the condition of the previous embodiment that the switches 102*a* and 102*b* are both under the turn-off state to make the node Nj under a floating state and the output voltage V3 be unknown.

Figure 7B:
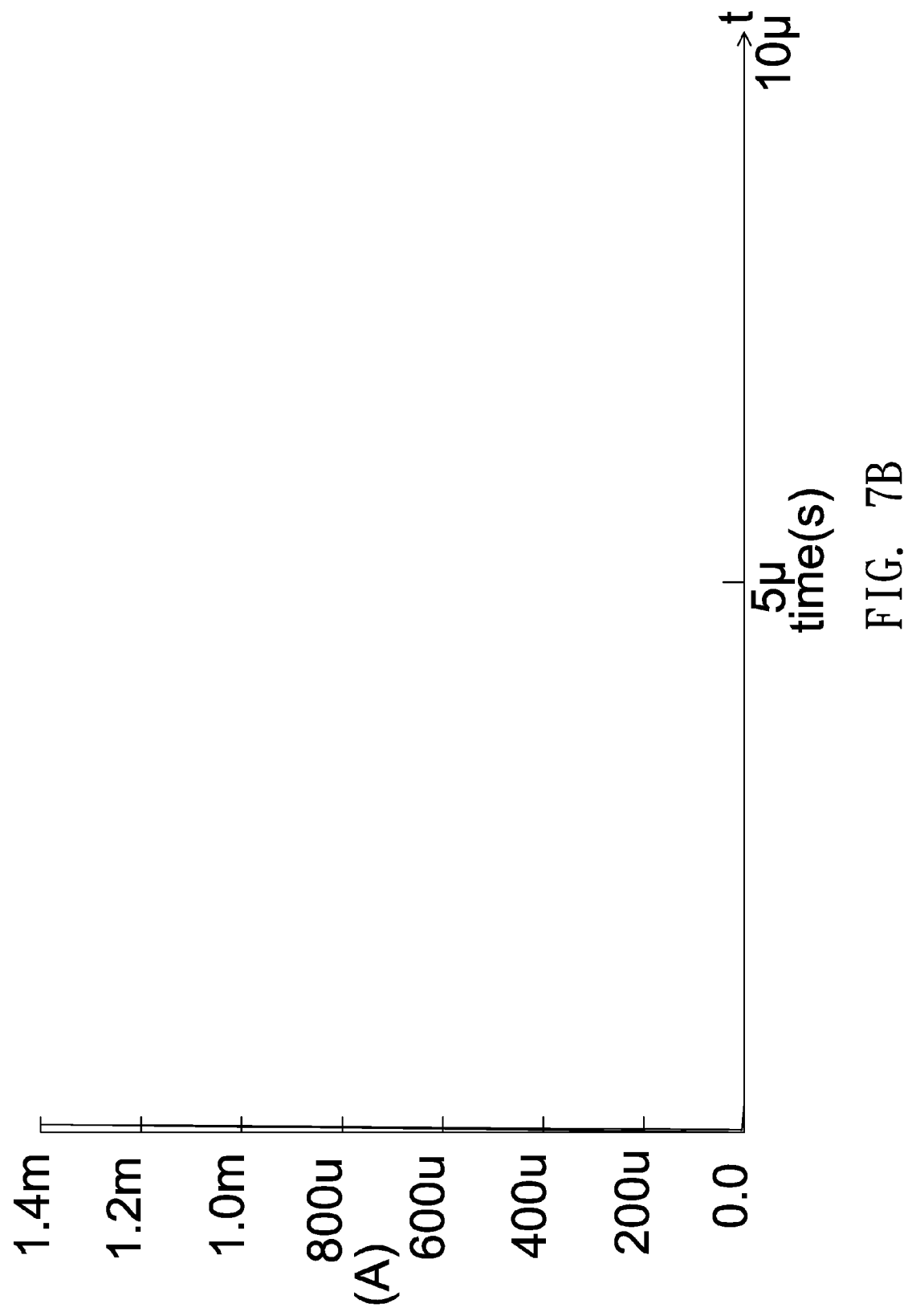
FIG. 7B shows a schematic diagram illustrating current simulation corresponding to FIG. 7A.

Please refer to FIG. 7B. FIG. 7B shows a schematic diagram illustrating current simulation of the ESD protection circuit corresponding to FIG. 7A. When the voltage is rising too fast (just powering on the circuit), the unexpected current is close to zero (current shown in FIG. 7B). Compared to the unexpected maximum current value of the conventional ESD protection circuit being possibly more than 400 mA, the unexpected maximum current value of according to the embodiment is about 1.4 mA and thus the unexpected current is greatly reduced to thereby reduce the risk of short circuiting.

After the ESD protection circuit 400 is under a stable state, from FIG. 7A, the voltage levels of $V_p$ and $V_n$ are separately equal to that of the operating voltage Vdd and the switch 402*a* is still under the turn-off state and the switch 402*b* is under the turn-on state. The ESD protection circuit 400 is back to a power-off state.

When the input voltage Vin is the electrostatic voltage $V_{ESD}$ and the input voltage Vin is under the quick power on period Tr, the ESD protection circuit substantially satisfies the following equations:

$$V_{ESD} - Vp = V_1 = \frac{Z_1}{Z_1 + Z_2 + Z_3} \times V_{ESD} > V_{thp} \qquad (9)$$

$$V_n - 0 = V_2 = \frac{Z_3}{Z_1 + Z_2 + Z_3} \times V_{ESD} > V_{thn} \qquad (10)$$

where $V_{ESD}$ represents the voltage level generated at the time of electrostatic discharge.

From the equations (8) and (10), it can be understood that, regardless of being under normal operation or electrostatic discharge, the voltage level of the turn-on voltage V2 is designed to be larger than the threshold voltage $V_{thn}$ of the switch 402*b*.

Figure 8A:
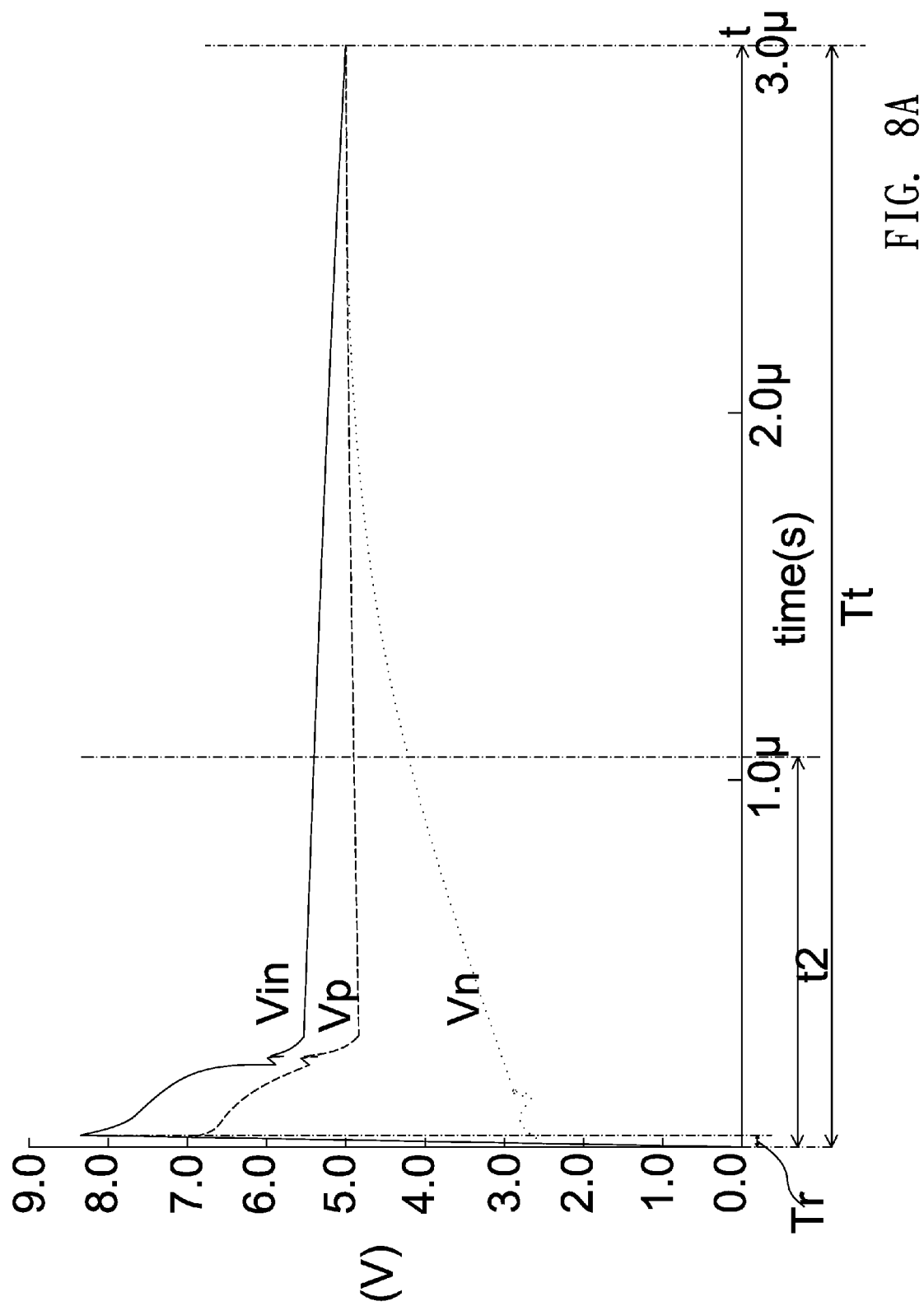
FIG. 8A shows a schematic diagram illustrating voltage simulation of the electrostatic discharge (ESD) protection circuit when an electrostatic voltage $V_{ESD}$ occurs according to one embodiment of the invention.

Please refer to FIG. 8A. FIG. 8A shows a schematic diagram illustrating voltage simulation of the electrostatic discharge (ESD) protection circuit when the electrostatic voltage $V_{ESD}$ is directed into the circuit according to one embodiment of the invention. From FIG. 8A, the relation of the voltages Vin, $V_p$, and $V_n$ are shown.

The switching circuit 403 is coupled to the decision circuit 402 and the input voltage Vin and the turn-on or turn off state of the switching circuit 403 is determined according to the output voltage V3. When the switching circuit 403 is turned on, the current is released to the ground (low) potential G via the switching circuit 403. In this embodiment, the switching circuit 403 is implemented by an N type MOSFET but is not limited to this example.

When electrostatic discharge occurs and the input voltage Vin is the electrostatic voltage $V_{ESD}$, from the above equation (9)

$$\left( V_{ESD} - Vp = V_1 = \frac{Z_1}{Z_1 + Z_2 + Z_3} \times V_{ESD} > V_{thp} \right),$$

the voltage $V_{ESD}$ is still divided by the resistances Z1, Z2 and Z3, the voltage level of the electrostatic voltage $V_{ESD}$ is far larger than the operating voltage Vdd even after voltage dividing and thus the voltage level of the turn-on voltage V1 caused by the electrostatic voltage $V_{ESD}$ is larger than that of the threshold voltage $V_{thp}$ of the switch 402*a*. Thus, the switch 402*a* is under the turn-on state and the switching circuit 403 is turned on to release the current caused by the electrostatic voltage $V_{ESD}$. Noticeably, after the electrostatic voltage $V_{ESD}$ quickly rises (Tr), since some small current flows through the capacitor 401 d and the voltage of the capacitor 401*d* rises slightly, from FIG. 8A, it is found that the voltages $V_p$ and $V_n$ are still slowly rising and gradually close to the input voltage Vin. In FIG. 8A, the labeled time "t2" indicates the time when the turn-on voltage V2 formed by the voltage $V_p$ and the electrostatic voltage is smaller than the threshold voltage $V_{thp}$ of the switch 402a. At the time, the switching circuit 403 is turned off.

As for the turn-on voltage V2 of the node N3, from the above equation (10), it is found that the voltage level of the turn-on voltage V2 is larger than the threshold voltage $V_{thn}$ of the switch 402b and the switch 402b is under the turn-on state.

Figure 8B:
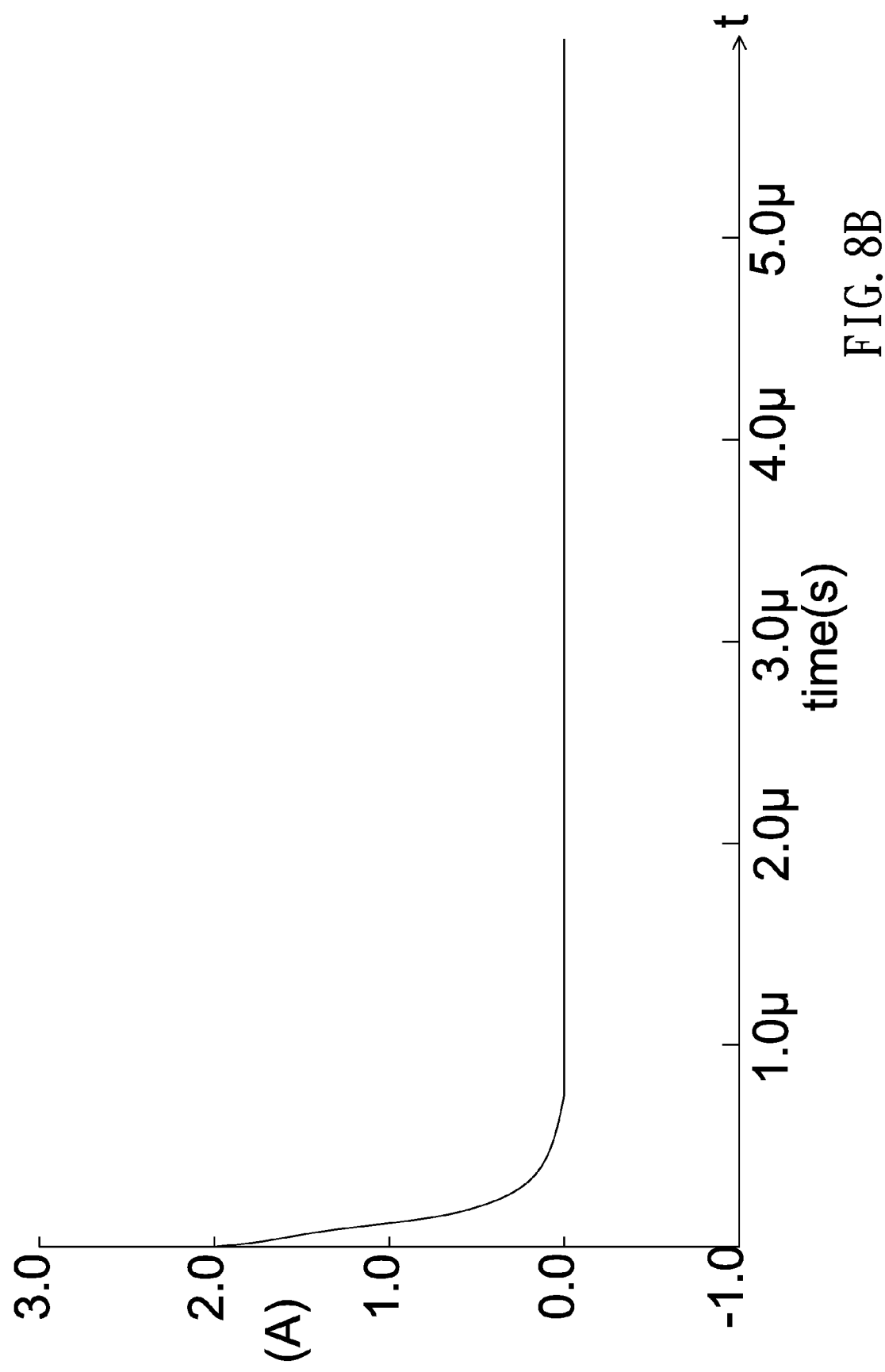
FIG. 8B shows a schematic diagram illustrating current simulation corresponding to FIG. 8A.

Please further refer to FIG. 8B. FIG. 8B shows a schematic diagram illustrating current simulation of the ESD protection circuit 400 corresponding to FIG. 8A. In the period that the turn-on voltage V1 is larger than the threshold voltage $V_{thp}$ of the switch 402a, since the switching circuit 403 is turned on, a current (current shown in FIG. 8B) is generated and flows through the switching circuit 403 to be released to the ground potential G via the switching circuit 403 to prevent permanent damage by the electrostatic voltage $V_{ESD}$.

Besides, a time constant corresponding to the resistors 401a, 401b, 401c and the capacitor 401d is required to be larger than the period of electrostatic discharge. In other words, the RC time constant composed of the resistors 401a, 401b, 401c and the capacitor 401d is required to be larger than the period of electrostatic discharge.

It should be noted that as shown in FIG. 8A, when the ESD protection circuit 400 is under a stable state, the voltage levels of the electrostatic voltage $V_{ESD}$, the voltage $V_p$, and the voltage $V_n$ are almost the same.

In practice, when electrostatic discharge occurs, the switches 402a and 402b are turned on simultaneously and the output voltage V3 is determined by the turn-on resistances of the switches 402a and 402b. In other words, the turn-on resistances of the switches 402a and 402b should be properly designed to have the voltage level of the output voltage V3 be able to turn on the switching circuit 403. Since the equivalent resistance of the switching circuit 403 is smaller than that of the decision circuit 402, the large current generated by electrostatic discharge can be released to the ground potential G via the switching circuit 403 to prevent the electronic elements from being damaged.

In conclusion, the ESD protection circuit according to the invention can recognize either electrostatic discharge or a normal operating voltage under a condition of quick voltage rising to prevent the ESD protection circuit from having false operation.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. An electrostatic discharge (ESD) protection circuit, having a first node for receiving an input voltage, the protection circuit comprising:
   a voltage-divider generating circuit, coupled to the first node wherein the voltage-divider generating circuit outputs a first voltage and a second voltage and the transient voltages of the first and the second voltage are different when the input voltage is under a transient period;
   a decision circuit, coupled to the voltage-divider generating circuit, wherein the decision circuit includes a first switch and a second switch being coupled to the first switch to form a node for outputting the output voltage, and the first switch and the second switch receive the first voltage and the second voltage separately to determine the voltage level of an output voltage according to the first voltage and the second voltage; and
   a switching circuit, coupled to the node for outputting the output voltage of the decision circuit and either being turned on or turned off according to the output voltage on the node for outputting the output voltage;
   wherein the voltage-divider generating circuit comprises:
   a first resistor, one end of which is coupled to the first node;
   a second resistor, coupled to the other end of the first resistor in series wherein the decision circuit is coupled to a second node which is between the second resistor and the first resistor; and
   a capacitor, coupled to the second resistor wherein the decision circuit s coupled to a third node which is between the second resistor and the capacitor.

2. The circuit according to claim 1, wherein the transient period is a rising period of the input voltage and the transient voltage of the first voltage and transient voltage of the second voltage are determined by the input voltage, the first resistor, and the second resistor.

3. The circuit according to claim 1, wherein the first switch of the decision circuit is coupled to the second node and is turned on or off according to the first voltage; and
   one end of the second switch of the decision circuit is coupled to the third node and the other end of the second switch of the decision circuit is coupled to the first switch wherein the second switch is turned on or off according to the second voltage;
   wherein the voltage level of the output voltage is determined by either turning on or off the first switch and the second switch.

4. The circuit according to claim 3, wherein the transient voltage of the first voltage makes the first switch turned off when the input voltage is an operating voltage and the transient period is a rising period of the input voltage.

5. The circuit according to claim 3, wherein the transient voltage of the first voltage makes the first switch turned on when the input voltage is an electrostatic voltage and the transient period is a rising period of the input voltage.

6. The circuit according to claim 3, wherein the transient voltage of the first voltage makes the first switch turned of when the input voltage is smaller than or equal to a preset value.

7. The circuit according to claim 3, wherein the transient voltage of the first voltage makes the first switch turned on when the input voltage is larger than a preset value.

8. The circuit according to claim 3, wherein the first resistor has a first resistance Z1, the second resistor has a second resistance Z2, the first switch has a threshold voltage $V_{thp}$ and, when the input voltage is an operating voltage $V_{dd}$, the transient voltage of the first voltage $V_p$ substantially satisfies the following equation:

$$V_{dd} - V_p = \frac{Z_1}{Z_1 + Z_2} \times V_{dd} < V_{thp}.$$

9. The circuit according to claim 8, wherein, when the input voltage is an electrostatic voltage $V_{ESD}$, the transient voltage of the first voltage $V_p$ substantially satisfies the following equation:

$$V_{ESD} - V_p = \frac{Z_1}{Z_1 + Z_2} \times V_{ESD} > V_{thp}.$$

10. The circuit according to claim 9, wherein the first resistor and the second resistor are P type metal-oxide-semiconductor field-effect transistors and the gate electrodes are separately coupled to ground potential.

11. The circuit according to claim 9, wherein the first resistor and the second resistor are N type metal-oxide-semiconductor field-effect transistors and the gate electrodes are separately coupled to the operating voltage.

12. The circuit according to claim 1, wherein the voltage-divider generating circuit further comprises:
a third resistor, coupled between the second resistor and the capacitor.

13. The circuit according to claim 12, wherein, When the input voltage is under a rising period, the transient voltage of the first voltage and transient voltage of the second voltage are determined by the input voltage, the first resistor, the second resistor and the third resistor.

14. The circuit according to claim 12, wherein the decision circuit comprises:
a first switch, coupled to the second node and being turned on or off according to the first voltage; and
a second switch, one end of Which is coupled to the third node and the other end of which is coupled to the first switch wherein the second switch is turned on or off according to the second voltage;
wherein the voltage level of the output voltage is determined by either turning on or off the first switch and the second switch.

15. The circuit according to claim 14, wherein the transient voltage of the second voltage makes the second switch turned on when the input voltage is under a rising period.

16. The circuit according to claim 14, wherein the first resistor has a first resistance Z1, the second resistor has a second resistance Z2, the third resistor has a third resistance Z3, the first switch has a threshold voltage $V_{thp}$, the second switch has a threshold voltage $V_{thn}$ and, when the input voltage is an operating voltage $V_{dd}$, the transient voltage of the first voltage $V_p$ and the transient voltage of the second voltage $V_n$ substantially satisfy the following equations:

$$V_{dd} - V_p = \frac{Z_1}{Z_1 + Z_2 + Z_3} \times V_{dd} < V_{thp} \text{ and}$$

$$V_n = \frac{Z_3}{Z_1 + Z_2 + Z_3} \times V_{dd} > V_{thn}.$$

17. The circuit according to claim 16, wherein, when the input voltage is an electrostatic voltage $V_{ESD}$, the transient voltage of the first voltage $V_p$ and the transient voltage of the second voltage $V_n$ substantially satisfy the following equations:

$$V_{dd} - V_p = \frac{Z_1}{Z_1 + Z_2 + Z_3} \times V_{ESD} > V_{thp} \text{ and}$$

$$V_n = \frac{Z_3}{Z_1 + Z_2 + Z_3} \times V_{ESD} > V_{thn}.$$

18. The circuit according to claim 17, wherein the decision circuit generates the output voltage according to turn-on resistances of the first switch and the second switch and the output voltage makes the switching circuit turned on.

19. An electrostatic discharge (ESD) protection circuit, having a first node for receiving an input voltage, the protection circuit comprising:
a voltage-divider generating circuit, coupled between the first node and a low potential; wherein the voltage-divider generating circuit outputs a first voltage and a second voltage and the transient voltages of the first voltage and the second voltage are different when the input voltage is under a transient period; wherein the transient voltage of the first voltage is at a voltage level between the input voltage and the low potential;
a decision circuit, coupled to the voltage-divider generating circuit, wherein the decision circuit includes a first switch and a second switch being coupled to the first switch to form a node for outputting the output voltage, and the first switch and the second switch receive the first voltage and the second voltage separately to determine the voltage level of an output voltage according to the first voltage and the second voltage; and
a switching circuit, coupled to the node for outputting the output voltage of the decision circuit and either being turned on or turned off according to the output voltage on the node for outputting the output voltage.

20. The circuit according to claim 19, when the input voltage is quickly rising and smaller than a preset value, the transient voltage of the first voltage is smaller than the threshold voltage of the first switch, and the first switch and the switching circuit are under a turn-off state.

21. The circuit according to claim 19, When an electrostatic discharge occurs and the input voltage is the electrostatic voltage, the transient voltage of the first voltage is larger than the threshold voltage of the first switch, and the first switch and the switching circuit are under a turn-on state.

* * * * *